(12) United States Patent
Rappl et al.

(10) Patent No.: US 9,796,038 B2
(45) Date of Patent: *Oct. 24, 2017

(54) WELDING SYSTEM WITH POWER LINE COMMUNICATION

(71) Applicant: ILLINOIS TOOL WORKS INC., Glenview, IL (US)

(72) Inventors: James Francis Rappl, Neenah, WI (US); Brian Lee Ott, Sherwood, WI (US); Andrew David Nelson, Grand Chute, WI (US); Jeremy Daniel Overesch, Neenah, WI (US); Anthony Van Bergen Salsich, Appleton, WI (US); Quinn William Schartner, Kaukauna, WI (US); Kenneth Austin Stanzel, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/624,104

(22) Filed: Feb. 17, 2015

(65) Prior Publication Data

US 2015/0158104 A1 Jun. 11, 2015

Related U.S. Application Data

(63) Continuation of application No. 12/843,321, filed on Jul. 26, 2010, now Pat. No. 8,957,344.

(Continued)

(51) Int. Cl.
*B23K 9/18* (2006.01)
*B23K 9/10* (2006.01)
(Continued)

(52) U.S. Cl.
CPC ............ *B23K 9/1087* (2013.01); *B23K 9/095* (2013.01); *B23K 9/1006* (2013.01); *B23K 9/1068* (2013.01); *B23K 9/124* (2013.01)

(58) Field of Classification Search
CPC .... B23K 9/095; B23K 9/1006; B23K 9/1068; B23K 9/1087; B23K 9/124
See application file for complete search history.

(56) References Cited

U.S. PATENT DOCUMENTS

| | | |
|---|---|---|
| 2,043,331 A | 6/1936 | Notvest |
| 2,175,891 A | 10/1939 | Graham |

(Continued)

FOREIGN PATENT DOCUMENTS

| | | |
|---|---|---|
| CN | 101360580 | 2/2009 |
| DE | 19828986 | 12/1999 |

(Continued)

OTHER PUBLICATIONS

International Search Report for application No. PCT/US2010/045906 dated Nov. 29, 2010.

*Primary Examiner* — Duy T Nguyen
(74) *Attorney, Agent, or Firm* — Fletcher Yoder P.C.

(57) ABSTRACT

Various welding systems that provide communication over auxiliary or weld power lines are provided. The disclosed embodiments may include a multi-process welding power supply that is communicatively coupled to a pendant via an auxiliary conduit that facilitates the exchange of data and power between components of the welding system. In some embodiments, the pendant may also include auxiliary outlets that allow an operator to power auxiliary devices at the weld location. The disclosed embodiments further include a pendant with a wire spool and wire feeder drive circuitry that is configured to activate spooling during MIG welding. Embodiments are provided that also allow for bidirectional (Continued)

data communication over a power line in networked welding systems.

20 Claims, 12 Drawing Sheets

Related U.S. Application Data

(60) Provisional application No. 61/247,396, filed on Sep. 30, 2009.

(51) Int. Cl.
  *B23K 9/095* (2006.01)
  *B23K 9/12* (2006.01)

(56) References Cited

U.S. PATENT DOCUMENTS

| | | | |
|---|---|---|---|
| 2,526,597 A | 10/1950 | Winslow |
| 2,642,515 A | 6/1953 | Bagg |
| 4,008,384 A | 2/1977 | Cecil |
| 4,051,344 A | 9/1977 | Robbins |
| 4,147,919 A | 4/1979 | Matasovic |
| 4,216,367 A | 8/1980 | Risberg |
| 4,216,368 A | 8/1980 | Delay |
| 4,227,066 A | 10/1980 | Bulwidas |
| 4,247,752 A | 1/1981 | Stringer |
| 4,266,114 A | 5/1981 | Hansen |
| 4,467,174 A | 8/1984 | Gilliland |
| 4,508,954 A | 4/1985 | Kroll |
| 4,521,572 A | 6/1985 | Cuscurida |
| 4,584,685 A | 4/1986 | Gajjar |
| 4,641,292 A | 2/1987 | Tunnell |
| 4,716,274 A | 12/1987 | Gilliland |
| 4,767,908 A | 8/1988 | Dallavalle |
| 5,039,635 A | 8/1991 | Stempin |
| 5,039,835 A | 8/1991 | Schwiete |
| 5,043,557 A | 8/1991 | Tabata |
| 5,276,305 A | 1/1994 | Hsien |
| 5,376,894 A | 12/1994 | Petranovich |
| 5,406,050 A | 4/1995 | Macomber |
| 5,653,902 A | 8/1997 | Chang |
| 5,982,253 A | 11/1999 | Perrin |
| 6,040,555 A | 3/2000 | Tiller |
| 6,103,994 A | 8/2000 | DeCoster |
| 6,156,999 A | 12/2000 | Ignatchenko |
| 6,365,868 B1 | 4/2002 | Borowy |
| 6,423,936 B1 | 7/2002 | Reed |
| 6,458,157 B1 | 10/2002 | Suaning |
| 6,570,132 B1 | 5/2003 | Brunner |
| 6,624,388 B1 | 9/2003 | Blankenship |
| 6,781,095 B2 | 8/2004 | Hayes |
| 6,906,285 B2 | 6/2005 | Zucker |
| 6,909,285 B2 | 6/2005 | Jordan |
| 7,180,029 B2 | 2/2007 | Ott |
| 2001/0043656 A1 | 11/2001 | Koslar |
| 2004/0199846 A1 | 10/2004 | Matsumoto |
| 2004/0232128 A1 | 11/2004 | Niedereder |
| 2005/0016975 A1 | 1/2005 | Reynolds |
| 2005/0199605 A1* | 9/2005 | Furman .................. B23K 9/095 219/132 |
| 2005/0230372 A1 | 10/2005 | Ott |
| 2005/0263513 A1 | 12/2005 | Leisner |
| 2006/0077046 A1 | 4/2006 | Endo |
| 2006/0138113 A1 | 6/2006 | Ott |
| 2006/0213892 A1 | 9/2006 | Ott |
| 2006/0276288 A1 | 12/2006 | Iwanaka |
| 2007/0114216 A1 | 5/2007 | Ott |
| 2009/0039064 A1* | 2/2009 | Enyedy .................... B23K 9/12 219/132 |

FOREIGN PATENT DOCUMENTS

| | | |
|---|---|---|
| EP | 0575082 | 12/1993 |
| EP | 1586403 | 10/2005 |
| JP | 4017977 | 1/1992 |
| JP | 4162964 | 6/1992 |
| JP | 2003088957 | 3/2003 |
| JP | 2003154455 | 5/2003 |
| JP | 2003191075 | 7/2003 |
| JP | 2003236663 | 8/2003 |
| JP | 2003236669 | 8/2003 |
| WO | 9958285 | 11/1999 |

* cited by examiner

WELDING SYSTEM WITH POWER LINE COMMUNICATION

CROSS REFERENCE TO RELATED APPLICATIONS

This application is a Continuation Patent Application for U.S. patent application Ser. No. 12/843,321, entitled "Welding System with Power Line Communication", filed Jul. 26, 2010, and issued as U.S. Pat. No. 8,957,344 on Feb. 17, 2015, which is a Non-Provisional Patent Application of U.S. Provisional Patent Application No. 61/247,396, entitled "Welding System with Power Line Communication", filed Sep. 30, 2009, both of which are herein incorporated by reference.

BACKGROUND

The invention relates generally to welding systems, and more particularly to welding systems with power line communication.

Traditional single process welding systems support a variety of processes, such as metal inert gas (MIG) welding, tungsten inert gas (TIG) welding, stick welding, and so forth, which may operate in different modes, such as constant current or constant voltage. Such welding systems typically include a single output connection and, therefore, are configured to support a single process at a time. In contrast to these single process welding systems, multi-process welding systems may connect to and support multiple processes at the same time.

Certain multi-process welding applications, such as coal-fired boiler repair, shipyard work, and so forth, may position a welding location or workpiece large distances from a multi-process welding power source. The power source provides conditioned power for the welding application, and the welder must pull and monitor a long welding power cable extending from the power source to the welding location. In such applications, changing welding processes and settings traditionally requires a manual adjustment to a knob or switch on or proximate to the welding power source, and even connection of entirely different welding cables to the source, particularly when the welder uses stick or MIG processes for some of the work, and a TIG process for other work, typically finer or more intricate tasks. Furthermore, the welder often uses auxiliary devices, such as lights and electric grinders, at the location of the weld. However, the auxiliary outlets that support such devices are located on the power supply. Accordingly, the location of power terminals (e.g., plugs) and controls on or proximate to the welding power source may require the user to stop welding and return to the power source to plug in auxiliary devices, make changes to the welding process, and so forth. In many applications, this may entail walking back considerable distances, through sometimes complex and intricate work environments.

Accordingly, there exists a need for systems and methods for providing more convenient power and control functionalities in multi-process welding systems, particularly in environments where the welding operation is carried out at a considerable distance from the welding power source.

BRIEF DESCRIPTION

The present invention provides solutions for such welding applications. In accordance with certain embodiments, welding systems are provided that offer communication over auxiliary or weld power lines. The disclosed embodiments may include a multi-process welding power supply that is communicatively coupled to a remotely located pendant via an auxiliary conduit that facilitates the exchange of data and power between components of the welding system. In some embodiments, data may be bidirectionally transferred over an auxiliary power line between the power supply and the pendant. The pendant may also include auxiliary outlets that allow an operator to power auxiliary devices at the weld location. The disclosed embodiments may further include a pendant with a wire spool and wire feeder drive circuitry that is configured to feed wire during MIG welding.

Furthermore, embodiments are provided that allow for bidirectional data communication over a power line in networked welding systems. Control circuitry is also provided that may include memory and processing circuitry and may be located in the power supply, the pendant, or both.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
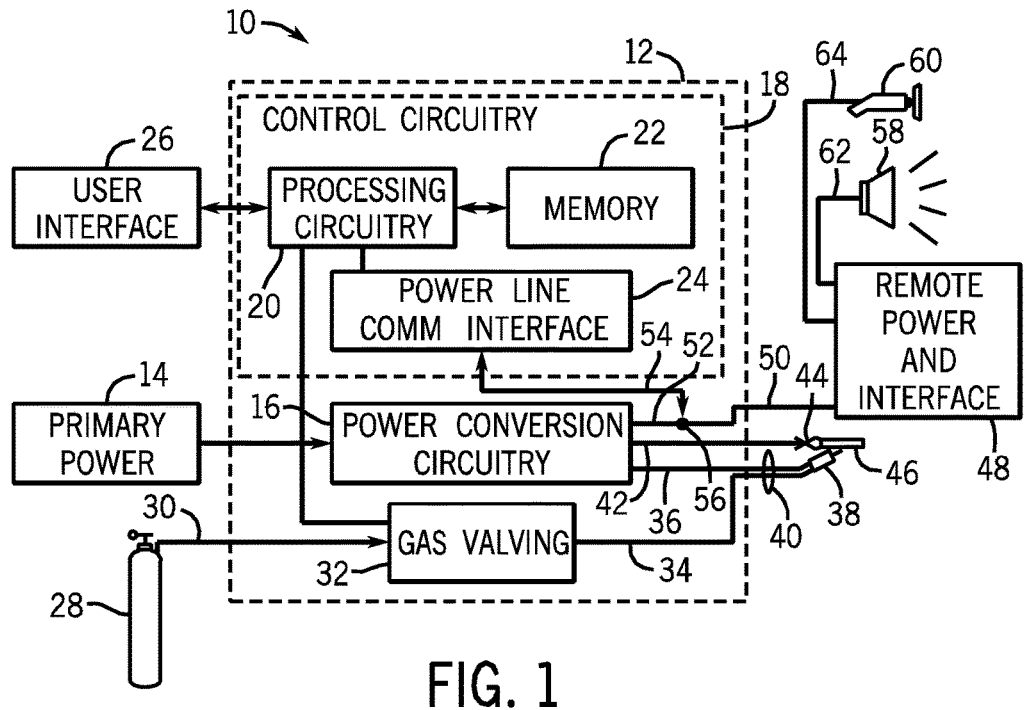
FIG. 1 is a diagram of an exemplary welding system having a multi-process power supply and a pendant that bidirectionally communicate data over a power line in accordance with aspects of the present invention.

As discussed in detail below, various embodiments of welding systems that provide communication over auxiliary or weld power lines are provided. Some embodiments include a multi-process welding power supply that is communicatively coupled to a pendant via an auxiliary conduit that facilitates the exchange of data and power between components of the welding system. In some embodiments, as used herein, the term "pendant' refers to an auxiliary power and control device that is designed to be coupled to a welding power supply to provide power to one or more auxiliary devices. That is, in embodiments disclosed herein, data may be bidirectionally transferred over an auxiliary power line between the power supply and the pendant. The pendant may include auxiliary outlets that allow an operator to power auxiliary devices at the weld location as well as an operator interface that allows the operator to program a welding process, welding parameters, and so forth from the location of the weld. The disclosed embodiments further include a pendant with a wire spool and wire feeder drive circuitry that is configured to feed wire during MIG welding. Furthermore, embodiments are provided that allow for bidirectional data communication over a power line in networked welding systems. In such embodiments, a central welding power source may be shared by multiple welding power supplies, which communicate with one or more remote control and monitoring stations over an auxiliary power line.

Control circuitry is provided that may be located in the power supply, the pendant, or both, as also discussed below. The control circuitry may include processing circuitry and memory. The memory may include volatile or non-volatile memory, such as read only memory (ROM), random access memory (RAM), magnetic storage memory, optical storage memory, or a combination thereof. Furthermore, a variety of control parameters may be stored in the memory along with code configured to provide a specific output (e.g., initiate wire feed, enable gas flow, etc.) to the pendant during operation. An operator interface located on the power supply, the pendant, or both, may allow a user to set the process (e.g., set constant current, constant voltage, or regulated metal deposition), set the polarity (e.g., set direct current electrode negative (DCEN) or direct current electrode positive (DCEP)), enable or disable a wire feed, and enable or disable gas flow.

Moreover, as noted above, the present techniques may implement power line communication in at least one, and potentially several ways. For example, in some embodiments, the data is transmitted over an "auxiliary" power line between the pendant and the power supply, with the pendant also allowing for powering of devices such as lights, powered hand tools, and so forth. Secondly, in some applications, data may be transmitted between power supplies, using a power line as a "data backbone" for the exchange of data that may be used for control and/or monitoring functions by the different power supplies. Such power line communication may be used with or without "auxiliary" power data communication, and vice versa. Moreover, some data may also be transmitted over a welding cable along with weld power (i.e., power signals adapted for creating and sustaining a welding arc between an electrode and a workpiece). Such data communication is described, for example, in U.S. Pat. No. 7,180,029 B2, U.S. application Ser. No. 11/276,288, U.S. patent application Ser. No. 11/609,871, and U.S. patent application Ser. No. 11/625,357, which are hereby incorporated into the present disclosure by reference.

Turning now to the drawings, FIG. 1 is a diagram of an exemplary welding system 10 including a multi-process welding power supply 12 in accordance with aspects of the present invention. The multi-process power supply 12 is configured to supply power to a plurality of welding devices (e.g., MIG torch, TIG torch, stick electrode, etc.) associated with a variety of welding processes (e.g., MIG, TIG, stick, etc.). In certain embodiments, the power supply 12 receives primary power 14 from an alternating current power source (e.g., the AC power grid, an engine/generator set, a battery, or a combination thereof), conditions the input power, and provides an output power to one or more welding devices in accordance with demands of the system 10. The primary power 14 may be supplied from an offsite location (i.e., the primary power 14 may originate from a wall outlet). Accordingly, in some embodiments, the power source 12 may include power conversion circuitry 16 that includes circuit elements such as transformers, rectifiers, switches, and so forth, capable of converting the AC input power to a DCEP or DCEN output as dictated by the demands of the system 10. Such circuits are generally known in the art.

In some embodiments, the power conversion circuitry 16 may be configured to convert the primary power 14 to both weld and auxiliary power outputs. However, in other embodiments, the power conversion circuitry 16 may be adapted to convert primary power only to a weld power output, and a separate auxiliary converter may be provided to convert primary power to auxiliary power. Still further, in some embodiments, the power supply 12 may be adapted to receive a converted auxiliary power output directly from a wall outlet. Indeed, any suitable power conversion system or mechanism may be employed by the power supply 12 to generate and supply both weld and auxiliary power.

The power supply 12 also includes control circuitry 18 that is configured to receive and process a plurality of inputs regarding the performance and demands of the system 10. The control circuitry 18 includes processing circuitry 20, memory 22, and a communication power interface module 24. The memory 22 may include volatile or non-volatile memory, such as ROM, RAM, magnetic storage memory, optical storage memory, or a combination thereof. Furthermore, a variety of control parameters may be stored in the memory 22 along with code configured to provide a specific output (e.g., initiate wire feed, enable gas flow, etc.) during operation. The processing circuitry 20 may also receive an input from a user interface 26 located on the power supply 12, through which the user may choose a process, and input desired parameters (e.g., voltages, currents, particular pulsed or non-pulsed welding regimes, and so forth).

The power supply 12 may also include a gas cylinder 28. The gas cylinder 28 may supply shielding gases, such as argon, helium, carbon dioxide, and so forth, via hose 30. In the embodiment illustrated in FIG. 1, the gas enters gas valving 32 located in the power supply 12. During use, the gas valving 32 modulates the amount of gas supplied to a welding operation via gas conduit 34. The gas conduit 34 and a power conduit 36 supply a welding device 38 (e.g., TIG torch) with gas and power, respectively. The power conduit 36 transfers the power output by the power conversion circuitry 16 to the welding device 38 to power the welding process during operation.

A plurality of conduits 40 couple the power supply 12 to the welding device 38. In the illustrated embodiment, the plurality of conduits 40 is shown as a group of individual connections to the welding device 38. However, it should be noted that in alternate embodiments, the plurality of conduits 40 may be bundled into a single supply cable that connects the power supply 12 to the welding device 38. A lead cable 42 terminating in a clamp 44 couples the power conversion circuitry 16 to a workpiece 46.

In the illustrated embodiment, the power supply 12 is coupled to a pendant 48. As used herein, the pendant 48 is a welding control device designed to allow an operator to choose welding processes and settings from a remote location with respect to the power supply 12. The pendant 48 is further designed to provide power to one or more auxiliary devices (e.g., lights, hand grinders, etc.) at the location of the weld. That is, the pendant 48 provides a user with both remote control of the welding settings as well as a remote source of auxiliary power. Accordingly, the pendant 48 is coupled to the power source 12 via an auxiliary conduit 50. The auxiliary conduit 50 provides auxiliary power to the pendant 48 and facilitates bidirectional data exchange between the pendant 48 and the power supply 12. That is, embodiments of the present invention allow for data communication over an auxiliary power cable.

In the illustrated embodiment, an auxiliary power line 52 exits the power conversion circuitry 16 and meets a data stream, as represented by reference numeral 54 that exits the control circuitry 18 at node 56 within the power supply 12. Data, therefore, may be transferred from the pendant 48 via auxiliary conduit 50 to the communication power interface module 24 in the power supply 12. Data may also be transferred from the communication power interface module 24 to the pendant 48 via the same path. Concurrently, auxiliary power may be transferred from the power conversion circuitry 16 in the power supply 12 to the pendant 48 via power line 52 and auxiliary conduit 50. In other words, presently contemplated embodiments allow for communication over an existing power line.

The power line communication circuitry and protocols used for this communication may follow any of several available standards, such as ISO/IEC14908.1, available from ECHELON under the commercial designation LON-WORKS 2.0. In general, certain such systems will include circuitry at the power supply configured to modulate data signals and superimpose the data or otherwise combine the signals with power signals (e.g., AC waveforms) transmitted to the remote location of the pendant 48 via the power line 52. The pendant will include complimentary circuitry that demodulates the data signals and provides them to processing circuitry configured to display, act on, or otherwise use the data signals. Conversely, the pendant circuitry may originate data signals, such as for changing settings of the power supply, and send these data signals over the same pendant auxiliary power line to be received and acted upon by the control circuitry of the power supply. In a typical application, the auxiliary power line may transmit 115 V AC power at 60 Hz, although other voltages and frequencies may be employed.

In certain embodiments, the pendant 48 may be located in close proximity to the welding operation but distant from the power supply 12. For instance, coal-fired boiler welding applications, shipyard applications, construction sites, and so forth, often requires a welding operator to be located distant from the power supply 12. Since the pendant 48 may be located close to the weld, the current system 10 may have the effect of reducing the amount of time and effort that the welding operator traditionally spends returning from the site of the weld to the power supply to plug in cords associated with auxiliary devices (e.g., lights, grinders, powered hand tools, etc.).

In the illustrated embodiment, the pendant 48 includes a user interface, through which a user may choose a process (e.g., MIG, TIG, stick, etc.), control the voltage, control the current, power auxiliary devices, and so forth, while remotely located with respect to the power supply unit 12. For example, in the embodiment shown, the user may plug in auxiliary devices, such as a light 58 or a hand grinder 60, into the pendant 48. Accordingly, the auxiliary power supplied to the pendant via auxiliary conduit 50 may be used to power such devices in a location proximate to the welding operation. The foregoing feature may have the effect of reducing the length of extension cables 62 and 64 as compared to traditional systems, since the light 58 and the grinder 60 derive auxiliary power from the pendant 48, which is close to the location of the weld, and not from the power supply 12, which may be distant from the weld. In addition to the user interface, in some embodiments, the pendant 48 may also include processing circuitry that receives inputs from the power supply 12 and the user interface, processes the inputs, and generates output data that may be communicated back to the power supply 12 over the auxiliary conduit 50.

In the embodiment illustrated in FIG. 1, the single gas source 28 and the single gas conduit 34 provide the means for the gas to be transferred from the power supply 12 to the welding device 38 if gas is suitable for the given welding process. In the embodiments illustrated in FIGS. 2, 3, and 4, however, a second gas supply 66 supplies a second gas to the gas valving 32 via a second gas conduit 68. In these embodiments, gas conduit 34 is routed from the power supply 12 to a remote box 72, which supplies the gas suitable for the welding operation being performed to the welding device. The gas valving 32 located in the power supply 12 modulates the release of the proper gas for a given operation. That is, the gas valving 32 may include directional control valving that selects gas source 28 or gas source 66 depending upon the active or selected process. Additionally, the gas line 34 may be purged when the system switches between the first gas supply 28 and the second gas supply 66. It should be noted that in other embodiments, an additional gas line may be routed from the gas valving 32 to the remote box 72 such that each gas source 28 or 66 is transported to the box 72 via a separate gas line.

Figure 2:
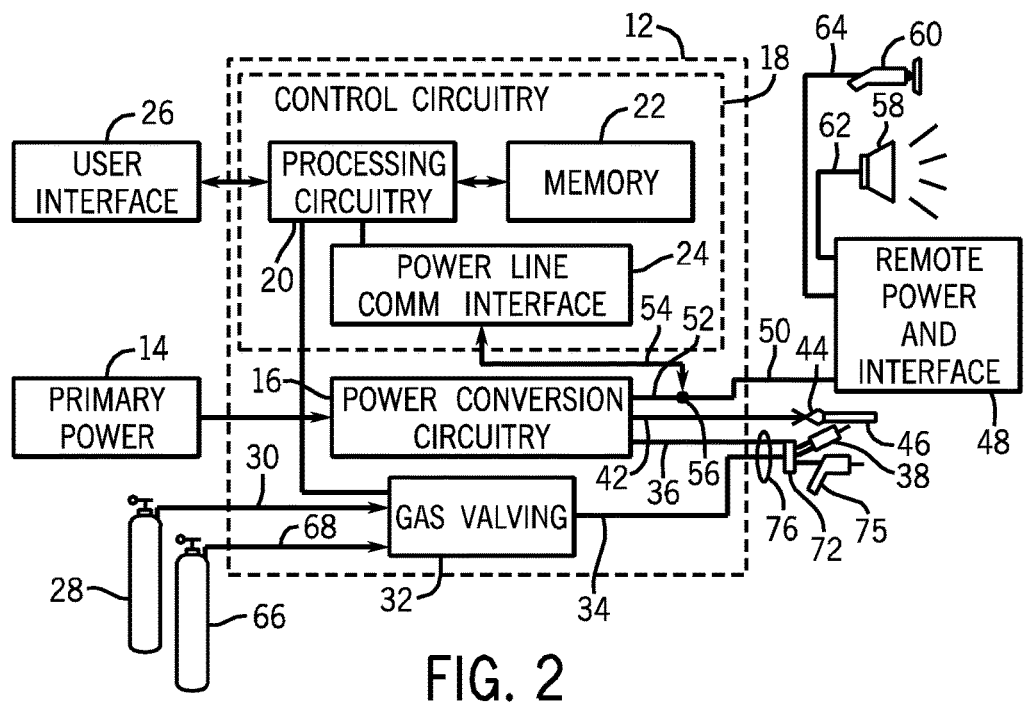
FIG. 2 is a diagram of the exemplary welding system of FIG. 1 that includes multiple gas sources in accordance with aspects of the present invention.
Figure 3:
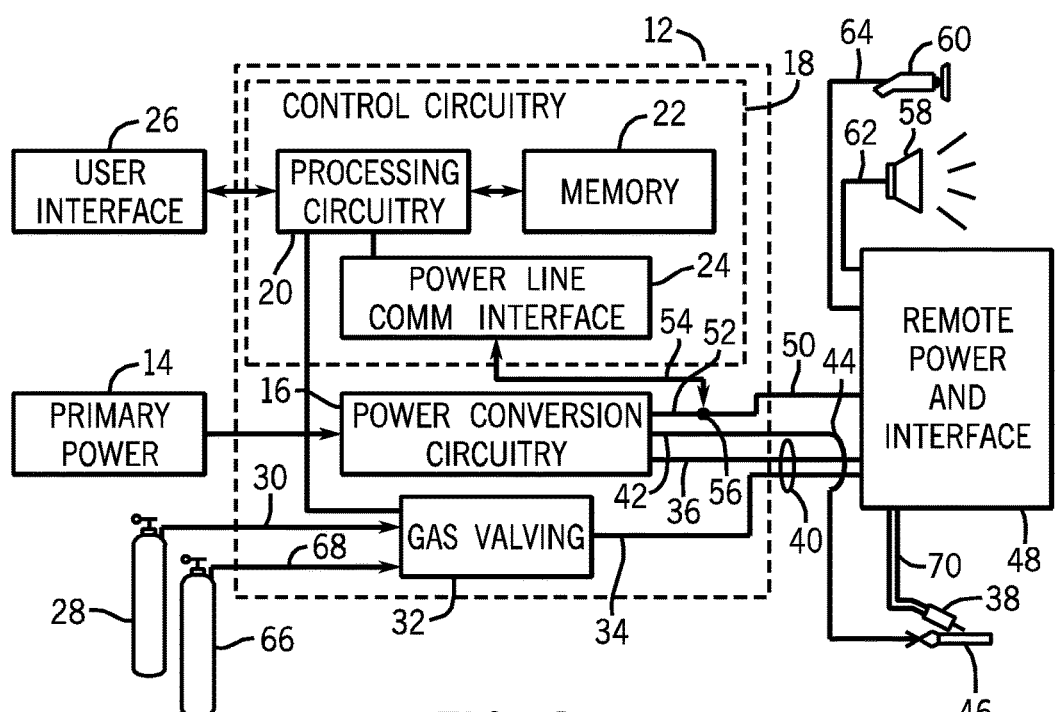
FIG. 3 is a diagram of the exemplary welding system of FIG. 1 that includes weld receptacles on the pendant in accordance with aspects of the present invention.

In the embodiment illustrated in FIG. 2, the weld power cable 36 and the gas cable 34 are routed to the remote box 72. Multiple welding devices, such as the first welding device 38 (e.g., a TIG torch) and a second welding device (e.g., a stick stinger) 75 may be plugged into the remote box 72 to access power and gas as necessary for the welding operation. In some embodiments, multiple welding devices may be plugged into the remote box 72 simultaneously. However, the only active device is the one necessary for the welding operation selected by the operator on the interface located on the pendant 48. For example, in the illustrated embodiment, both TIG torch 38 and stick stinger 75 may be plugged into the remote box 72 at the same time. However, only TIG torch 38 is active for use with the workpiece 46 if a user selects the TIG process from the interface on the pendant 48. It should be noted that in the illustrated embodiments, gas conduit 34 and power conduit 36 are shown as separate connections to the remote box 72. In further embodiments, the plurality of conduits 34 and 36, may be bundled together in a single supply cable, as indicated by reference numeral 76. In alternate embodiments, the gas conduit 34 may include a plurality of gas conduits (e.g., one gas conduit dedicated to each type of gas supplied) bundled together in a single supply cable, and the weld power conduit 36 may be separate. FIG. 3 illustrates an alternate embodiment of the system 10 shown in FIGS. 1 and 2. In this embodiment, both the auxiliary conduit 50 and the weld power conduit 36 are routed into pendant 48. Accordingly, the welding device 38 (e.g., TIG torch) may be connected to cable 70 and plugged into the pendant 48. Certain embodiments may support multiple welding devices (e.g., MIG torches, stick stingers, etc.) that operate at different polarities (e.g., DCEN or DCEP). For example, in one embodiment, multiple welding devices may be plugged into the pendant 48, but only one device may be active at a given time. That is, only the device designed for use with the process selected by the operator may be in use. In the illustrated embodiment, data may be communicated over power line 50, power conduit 36, or both. That is, the illustrated embodiment provides for communication over an auxiliary power line, a weld power line, or both.

Figure 4:
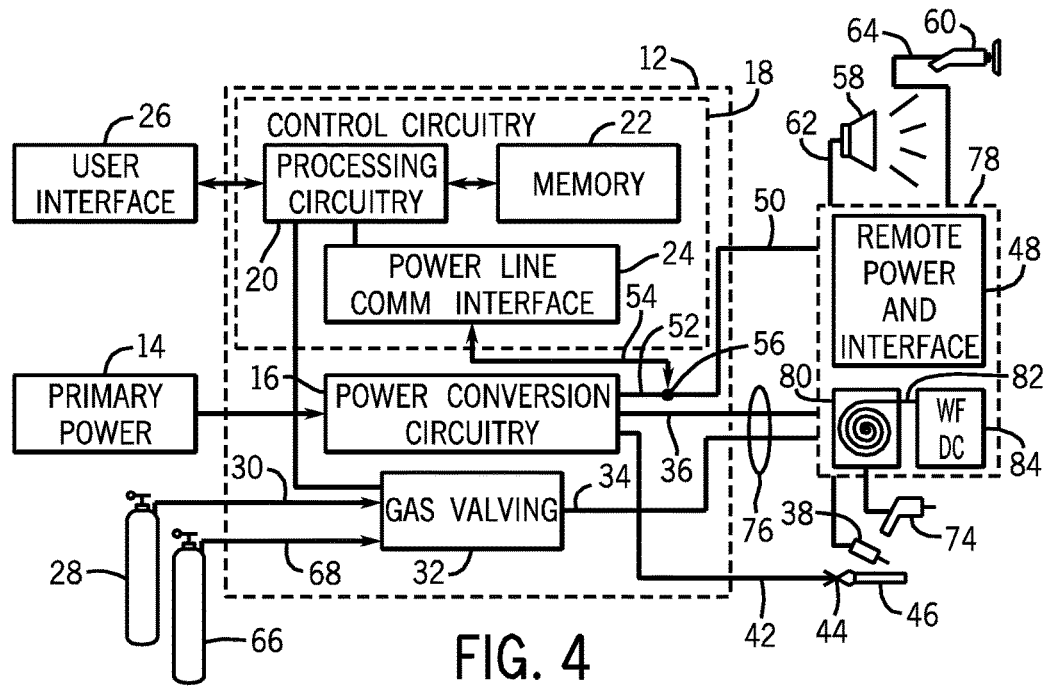
FIG. 4 is a diagram of the exemplary welding system of FIG. 2 wherein the pendant includes a wire feeder in accordance with aspects of the present invention.

In the embodiments illustrated in FIGS. 1, 2 and 3, a wire feeder (not shown) for use with MIG welding operations may be a stand-alone unit located in close proximity to the pendant 48. In alternate embodiments, the wire feeder may be located in or on the pendant 48, or, as illustrated in FIG. 4, the pendant itself may be incorporated within a wire feeder 78. In such an embodiment, a wire spool 80 feeds wire 82 into a wire feeder driver 84, which contains circuitry that initiates a wire feed to the MIG torch 74 during MIG welding operations. In this embodiment, the auxiliary devices 58 and 60 as well as the welding devices 38 and 74 may be plugged into the wire feeder 78. As before, the auxiliary conduit 50 provides auxiliary power for the auxiliary devices 58 and 60 and facilitates bidirectional communication over the power line between the power supply 12 and the wire feeder 78 while power conduit 36 provides weld power for welding devices 38 and 74. It should be noted that the weld power supplied over the power conduit 36 may be DCEP or DCEN as dictated by the demands of the system.

Figure 5:
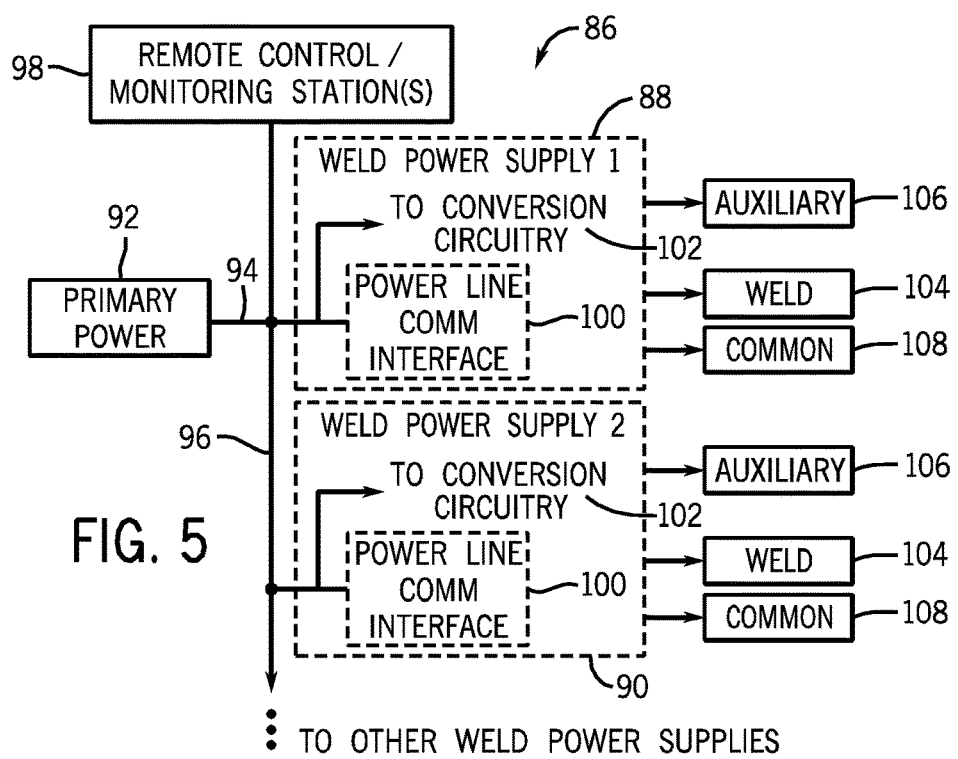
FIG. 5 is a diagram of an exemplary networked welding system including data communication over a power line in accordance with aspects of the present invention.

The embodiments of FIGS. 1-4 illustrate bidirectional data communication between a single power supply and a single pendant over an auxiliary power line. FIG. 5 illustrates a further embodiment of the present invention that includes such communication over a power line but in a networked welding system 86. For illustrative purposes, the shown embodiment includes a first welding power supply 88 and a second welding power supply 90. However, it should be noted that in other embodiments, any number of power supplies suitable for the welding application may be used with the present invention. For example, in one embodiment, only one power supply may be included. In such an embodiment, the power supply 88 and the remote control and/or monitoring station 98 may bidirectionally exchange data over the backbone 96. A common power source, e.g., the AC power grid, an engine/generator set, a battery, or a combination thereof, supplies primary power 92 to each of the power supplies (e.g., 88 and 90) in the network via power conduit 94 that supplies power to backbone 96 (e.g., a power line mains interface). The primary power source may be located in close proximity to or remote from one or more of the welding power supplies. The primary power 92 may be supplied from an offsite location (i.e., the primary power 92 may originate from a wall outlet in the plant).

One or more remote control and monitoring stations 98 transmits and receives data signals to and from the backbone 96 to facilitate communication both to and from the power supplies 88, 90. That is, the backbone 96 provides a means for both communication and power transmission to the networked welding system 86. In other words, a centralized backbone allows for communication over a power line to the power supplies. In some embodiments, the remote control and monitoring stations 98 may be configured to connect to an external network such that information may be bidirectionally communicated between the stations 98 and one or more external devices. Accordingly, the remote control and monitoring stations 98 may include hubs, switches, routers, repeaters, gateways, or a combination thereof.

In the illustrated embodiment, the welding power supplies 88, 90 include a communication power interface module 100, which is configured to send, receive and process instructions transmitted via the backbone 96 from the remote control and monitoring station 98. Each power supply 88, 90 also includes conversion circuitry 102, through which the incoming power is routed. The conversion circuitry 102 may include circuit elements, such as transformers, rectifiers, switches, and so forth, capable of converting the input power to suitable output power. For example, the power conversion circuitry 102 may convert incoming power to a DCEP or DCEN output as dictated by the demands of the system. Such conversion circuitry 102 may supply a weld power output 104 and an auxiliary power output 106. The weld power output 104 may be supplied to a welding device (e.g., a MIG torch, a TIG torch, a stick stinger) for use in a welding operation. Similarly, the auxiliary power output 106 may be supplied to auxiliary devices, such as lights and hand grinders, for use during the welding operation. A common ground output 108 may also extend from each power supply 88, 90 to close the welding circuit.

Figure 6:
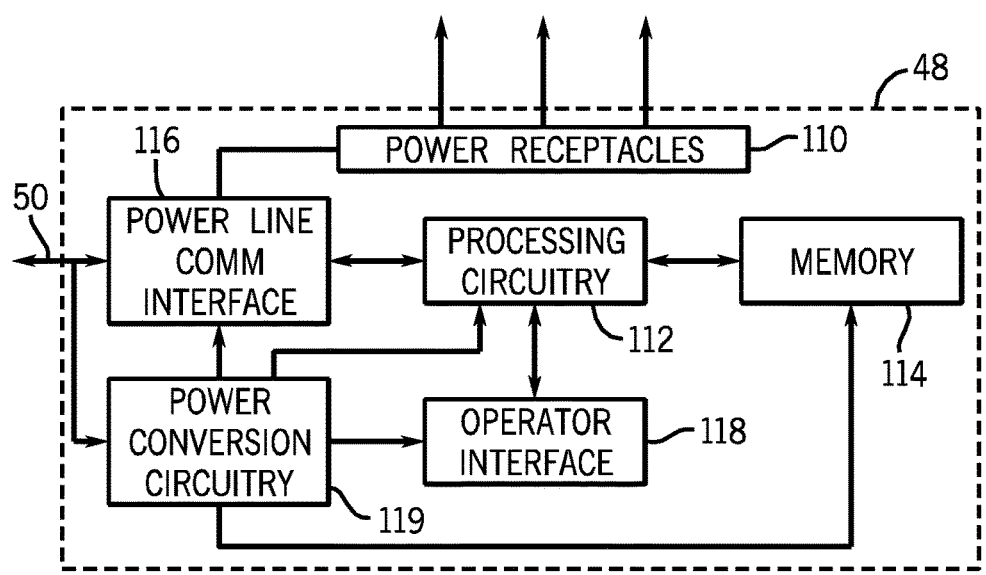
FIG. 6 is a diagram illustrating internal components of an exemplary pendant in accordance with aspects of the present invention.

FIG. 6 illustrates internal components that may be included in the pendant 48 of FIGS. 1-4. It should be noted that FIG. 6 illustrates one exemplary embodiment of the pendant 48, and that in further embodiments, more or fewer components may be included. In the illustrated embodiment, the pendant 48 includes power receptacles 110, processing circuitry 112, memory 114, a communication power interface module 116, and an operator interface 118. The power receptacles 110 provide a means for the operator to plug in auxiliary devices, such as lights and hand grinders, to receive auxiliary power during operation. Three power receptacles 110 are illustrated in FIG. 6. However, in other embodiments, any number of power receptacles 110 may be provided. The communication power interface module 116 receives both the incoming power from the power line and the incoming data transmitted over the power line. The communication power interface module 116 further routes the power to the power receptacles 110 and the data to the processing circuitry 112. The processing circuitry 112 receives and processes the incoming data transmitted via the auxiliary conduit 50 extracted by the communication power interface module. The operator interface 118 also generates data that corresponds to instructions received via operator interaction with the interface 118. This data is also received and processed by the processing circuitry 112. Accordingly, the processing circuitry 112 bidirectionally communicates with memory 114 to store and retrieve information as dictated by the demands of the system. Power conversion circuitry 119 may also be provided in the remote device 48 for the conversion of power to a level appropriate for use by the components of the remote device 48. That is, in one embodiment, the power conversion circuitry 119 may derive power from the incoming line 50 and convert it to an output appropriate for powering the processing circuitry 112, memory 114, and operator interface 118 components.

In certain embodiments, when the auxiliary conduit 50 is connected between the power supply 12 and the pendant 48, the control circuitry 18 may disable controls located on the user interface 26 located on the power supply that are redundant with controls on the operator interface 118 that is located on the pendant 48. In this way, activation of the pendant 48 and its associated operator interface 118 leads to deactivation of similar controls located on the power supply unit 12 such that all process control selection is relegated to the pendant 48 during operation.

Figure 7:
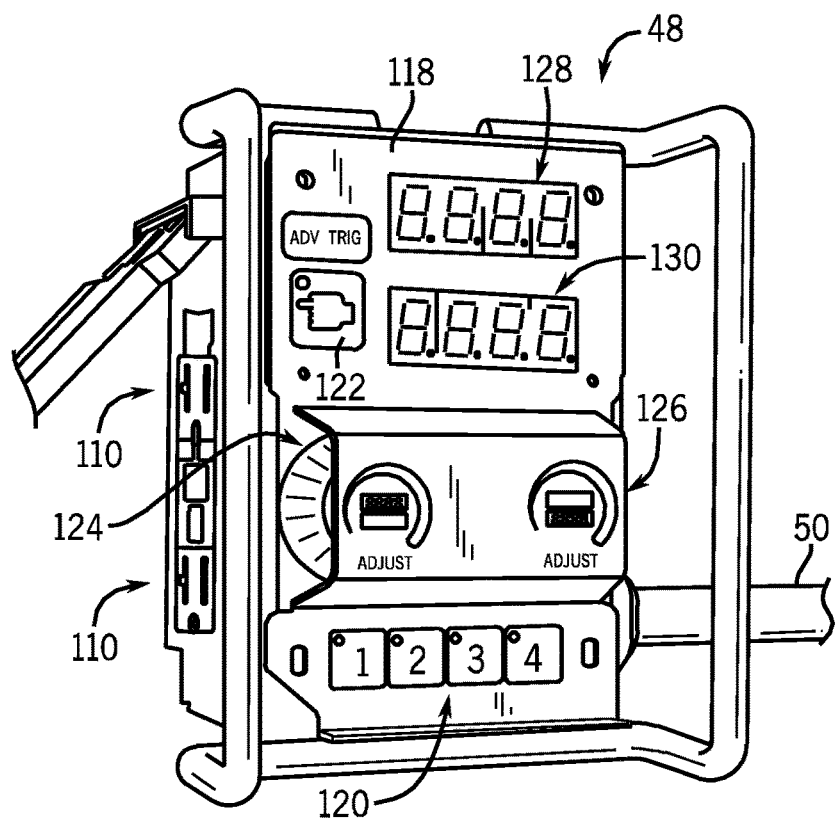
FIG. 7 is a perspective view of an exemplary operator interface that may be located on a pendant in accordance with aspects of the present invention.

One embodiment of the pendant 48 including an exemplary operator interface 118 and the power receptacles 110 is shown in FIG. 7. The pendant 48 receives power from the welding power supply 12 and transmits data over the auxiliary conduit 50. The operator interface 118 includes a plurality of buttons 120 that may be programmed to allow the user to change a variety of application specific parameters. For instance, the plurality of buttons 120 may include an output on/off button, a process button, a wire button, a gas button, and so forth. The operator interface 118 also includes a setup button 122 that the operator may use to set parameters associated with the chosen weld process. For example, in one embodiment, the user may press the setup button 122, and subsequently use adjustment knobs 124 and 126 to set parameters such as wire feed speed, type of gas, voltage, current, and so forth. Buttons 120 and 122 cooperate with display panels 128 and 130 to communicate options and choices with the user. For example, adjustment knob 124 may be used in conjunction with panel 128, and adjustment knob 126 may be used in conjunction with panel 130. For further example, the display panel 128 may be used to display the chosen weld polarity and process. In such an embodiment, the panel 128 may read +EP STICK, indicating that the user has chosen a DCEP polarity for a stick welding process. For further example, the display panel 130 may be used to display the type of information associated with a given process. In such an embodiment, the panel 130 may read VOLTS, AMPS, ARC LNGTH, ARC CONTRL, WIRE, GAS, and so forth. For further example, the display panels 128 and 130 may be used to display numerical values of weld parameters (e.g., a number that show the actual arc length).

Figure 8:
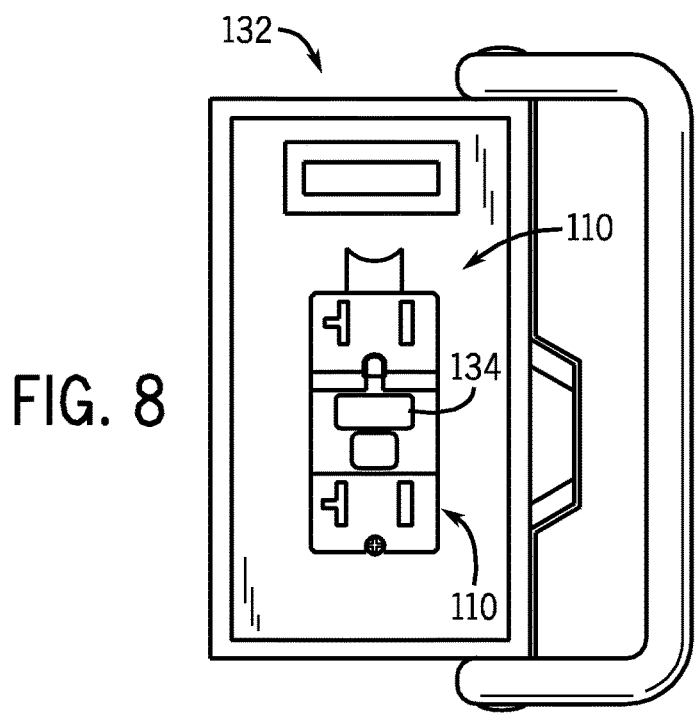
FIG. 8 is a side view of an exemplary pendant illustrating placement of power receptacles in accordance with aspects of the present invention.

FIG. 8 illustrates a side panel 132 of the pendant 48 that includes the power receptacles 110. The power receptacles 110 are configured to supply auxiliary power, such as 60 Hz single phase power, which may be used to power auxiliary devices associated with the welding operation. The side panel may also include a reset button 134, which may be used to ensure electrical protection of the pendant 48 and/or the auxiliary devices. For example, if a ground fault is detected by circuitry in the pendant 48, the reset button 134 may pop out, rendering the outlets inactive and alerting the operator. The operator may subsequently press the reset button 134 to reset the receptacles 110 and resume operation.

The embodiments of the pendant 48 illustrated in FIGS. 7 and 8 illustrate a "smart" pendant that includes many of the presently contemplated functionalities. However, it should be noted that in other embodiments the pendant 48 may include fewer functionalities. For instance, in one embodiment, the pendant 48 may not include interface 118. In such an embodiment, accessories such as a foot pedal may replace the illustrated interface as the operator interface. For instance, a potentiometer located in the foot pedal may allow the operator to control the amount of amps supplied to the welding process being performed. In fact, in some embodiments, such accessories (e.g., the foot pedal) may be the pendant 48. That is, 115V auxiliary power may enter the pendant 48 but may not be supplied to auxiliary devices at the location of the weld. However, data regarding operator input may still be exchanged with the power supply via the auxiliary power line. That is, in certain embodiments, the pendant 48 may not deliver auxiliary power but information may still be transmitted down the auxiliary power line.

Figure 9:
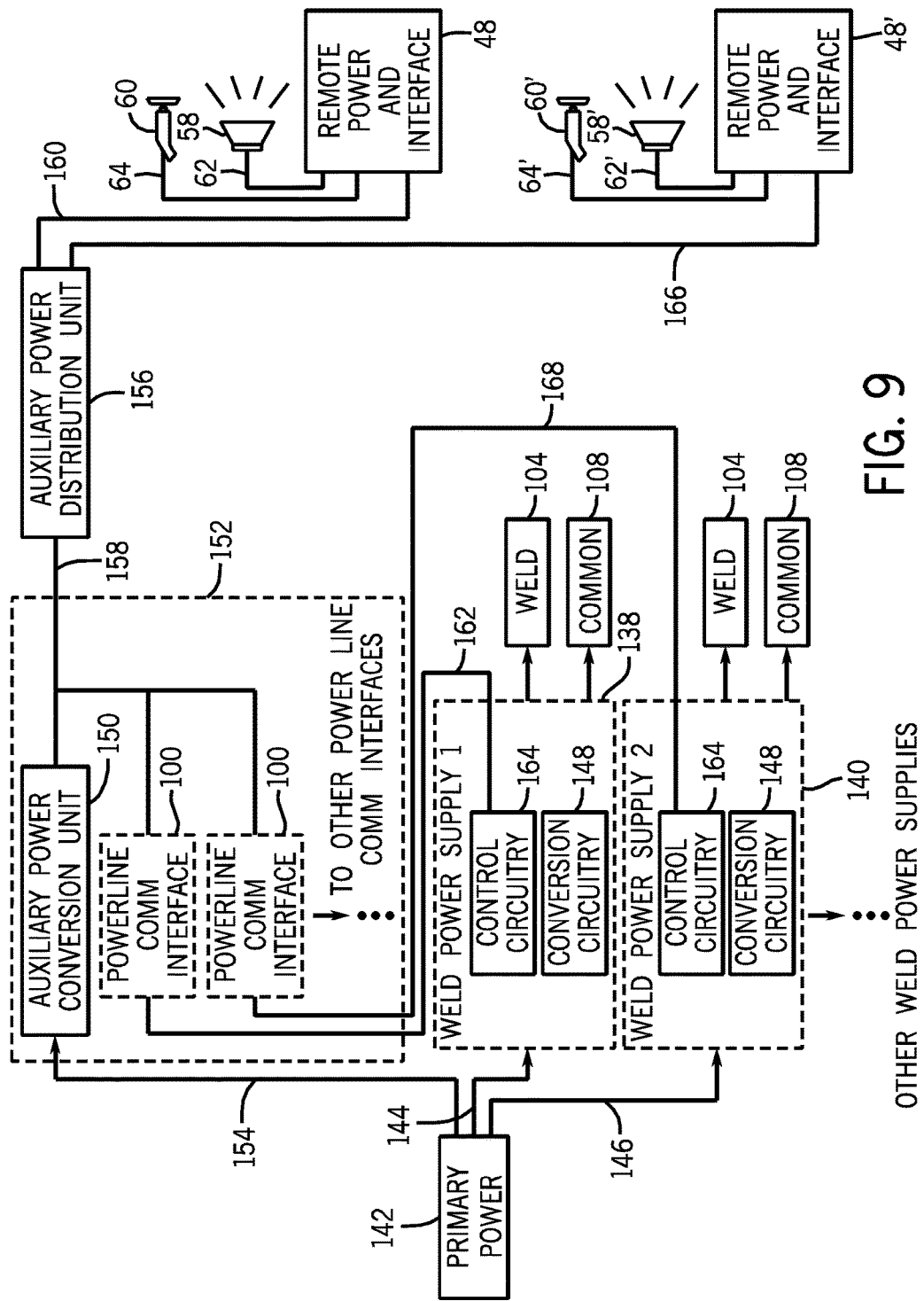
FIG. 9 is a diagram of an exemplary welding system including an auxiliary power distribution in accordance with aspects of the present invention.
Figure 10:
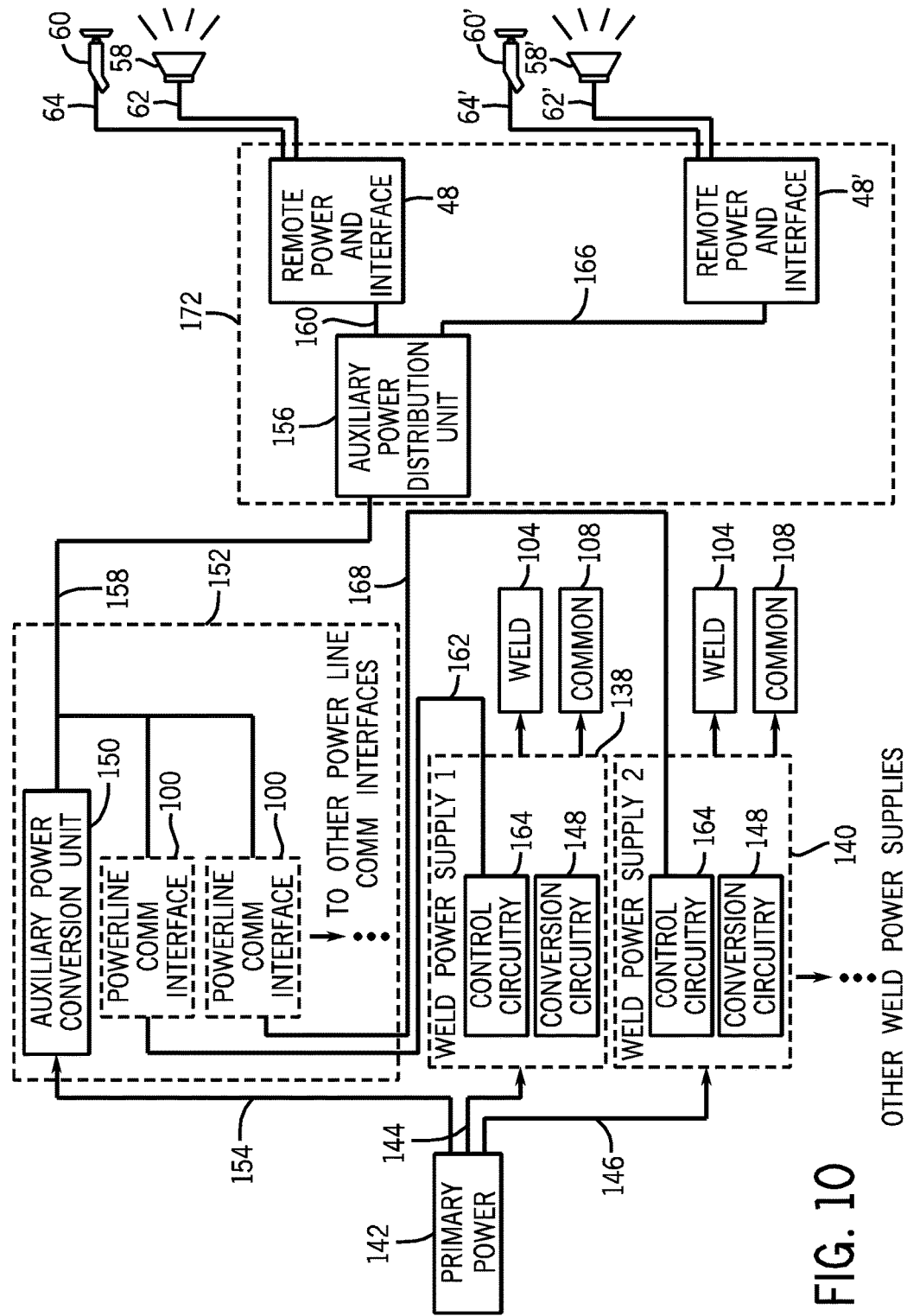
FIG. 10 is a diagram of the welding system of FIG. 9 wherein the auxiliary power distribution unit is located within a distribution box in accordance with aspects of the present invention.

FIGS. 9 and 10 illustrate further embodiments of the power line communication disclosed herein. FIGS. 9 and 10 illustrate welding systems that include a plurality of welding power supplies, e.g., a first weld power supply 138 and a second weld power supply 140. It should be noted that although only two weld power supplies are illustrated, in other embodiments, any number of weld power supplies may be included. A common power source, e.g., the AC power grid, an engine/generator set, a battery, or a combination thereof, supplies primary power 142 to each of the power supplies 138 and 140 in the network via power lines 144 and 146, respectively. The power source may be located in close proximity to or remote from one or more of the welding power supplies. As before, the primary power 142 may be supplied from an offsite location and may be supplied onsite via a wall outlet. In the illustrated embodiment, the welding power supplies 138 and 140 include conversion circuitry 148, through which the incoming primary power is routed. The conversion circuitry 148 may include circuit elements, such as transformers, rectifiers, switches, and so forth, capable of converting the input power to suitable output weld power. For example, the power conversion circuitry 148 may convert incoming power to a DCEP or DCEN output as dictated by the demands of the system. Such conversion circuitry 148 may supply a weld power output 104. The weld power output 104 may be supplied to a welding device (e.g., a MIG torch, a TIG torch, a stick stinger) for use in a welding operation. A common ground output 108 may also extend from each power supply 138 and 140 to close the welding circuit.

The primary power 142 is also supplied to an auxiliary power conversion unit 150 located in a receiving and transmitting (RT) unit 152 via power line 154. In some embodiments, the RT unit 152 may be located in close proximity to a rack of weld power supplies, e.g., 138 and 140. The auxiliary power conversion unit 150 is configured to receive primary power at a high voltage and output auxiliary power at a lower voltage. Accordingly, the auxiliary power conversion unit 150 may include circuitry, such as transformers, configured to step down the voltage of the incoming power. The RT unit 152 also includes a plurality of communication power interface modules 100, which are configured to transmit, receive, and process data transmitted to and from an auxiliary power distribution unit 156 via auxiliary power line 158. That is, presently contemplated embodiments provide for data communication over power line 158.

In the embodiment illustrated in FIG. 9, as before, one or more remotely located pendants 48, 48' are designed to allow an operator to choose welding processes and settings from a remote location with respect to the power supplies 138, 140. However, in this embodiment, a plurality of pendants, as represented by two pendants 48 and 48' but not meant to limit the invention, may be plugged into the central auxiliary power conversion unit 156. The pendants 48, 48' are still designed to provide power to one or more auxiliary devices 58, 58', 60, 60' at the location of one or more welds. That is, the pendants 48, 48' provide a user with both remote control of the welding settings as well as a remote source of auxiliary power for one or more welds. For example, pendant 48 may be located in close proximity to a first weld, and pendant 48' may be located in close proximity to a second weld remote from the first weld.

During operation, a first operator may input desired weld settings to pendant 48. These weld settings are transmitted via conduit 160 through the auxiliary power distribution unit 156, across power line 158, through communication power interface module 100, along data conduit 162, and to control circuitry 164 located in power supply 138. In this way, data may be bidirectionally communicated over power line 160 and power line 158. Similarly, a second operator may input desired weld settings to pendant 48'. These weld settings are transmitted via power line 166 through the auxiliary power distribution unit 156, across power line 158, through communication power interface module 100, along data conduit 168, and to control circuitry 164 located in power supply 140. In this way, data may be bidirectionally communicated over power line 166 and power line 158.

The embodiment illustrated in FIG. 10 operates similarly to that of FIG. 9. However, in this embodiment, the auxiliary power distribution unit 156 is located in a remote distribution box 172. The remote distribution box 172 also houses the pendants 48 and 48'. That is, in this embodiment, the operator interfaces for multiple welding processes may be located on one central remote box 172. Also, the auxiliary devices 58, 58', 60, 60' for multiple welding processes may also be plugged into the central distribution box 172. As before, data is communicated over power line 158 and transmitted back to the power supplies 138 and 140 for processing. Also, in the embodiments illustrated in FIGS. 9 and 10, two power supplies 138 and 140 are shown. However, it should be noted that in alternate embodiments, more or fewer power supplies may be included in the system. For example, in one embodiment, only one power supply may be included.

Figure 11:
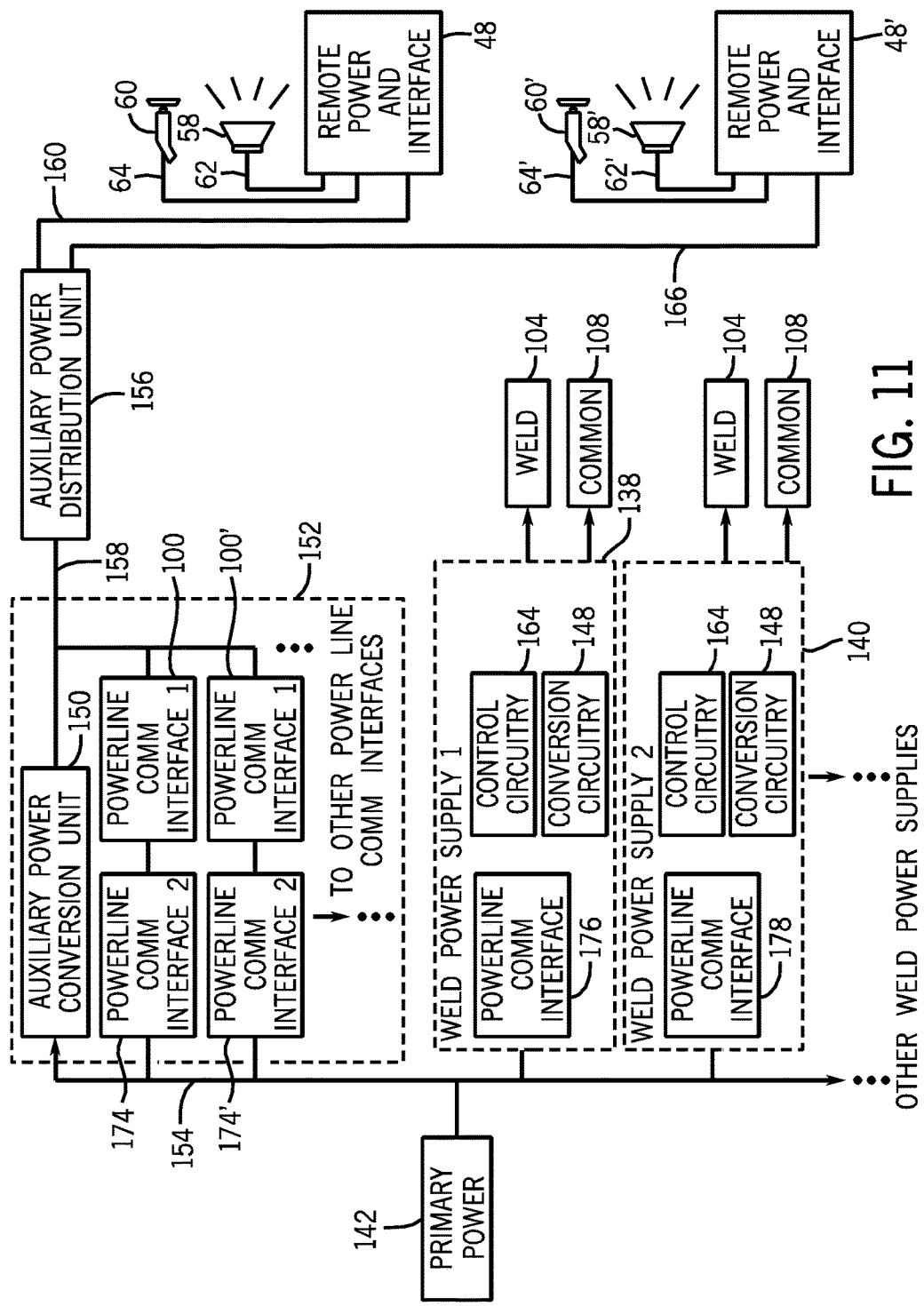
FIG. 11 is a diagram of an exemplary welding system that includes communication over both an auxiliary power line and a primary power line in accordance with aspects of the present invention.

FIG. 11 is a diagram of another exemplary welding system including communication over both a primary weld power line and an auxiliary power line. As before, the primary power 142 may be supplied from an offsite location and may be supplied onsite via a wall outlet. Primary power 142 is delivered to the welding power supplies 138 and 140 via primary power line 154. Accordingly, the power supplies 138 and 140 include conversion circuitry 148, through which the incoming primary power is routed. Such conversion circuitry 148 may supply a weld power output 104. The weld power output 104 may be supplied to a welding device (e.g., a MIG torch, a TIG torch, a stick stinger) for use in a welding operation. A common ground output 108 may also extend from each power supply 138 and 140 to close the welding circuit. In the illustrated embodiment, two power supplies 138 and 140 are shown. However, it should be noted that in alternate embodiments, more or fewer power supplies may be included in the system. For example, in one embodiment, only one power supply may be included.

The primary power 142 is also supplied to the auxiliary power conversion unit 150 located in the RT unit 152 via primary power line 154. That is, primary power 142 is supplied to both the auxiliary power conversion unit 150 and the power supplies 138 and 140 via power line 154. As before, the auxiliary power conversion unit 150 is configured to receive primary power at a high voltage and output auxiliary power at a lower voltage. The RT unit 152 also includes a first plurality of communication power interface modules 100 and 100', which are configured to transmit, receive, and process data transmitted to and from the auxiliary power distribution unit 156 via auxiliary power line 158. That is, presently contemplated embodiments provide for data communication over auxiliary power line 158. Additionally, the RT unit 152 includes a second plurality of communication power interface modules 174 and 174' configured to receive the data from the first plurality of communication power interface modules 100 and 100' and convert the data to a form suitable for communication over primary power line 154 for transmission to power supplies 138 and 140. Accordingly, power supply 138 includes a communication power interface module 176 configured to transmit, receive, and process data to and from power line 154. Likewise, power supply 140 includes a communication power interface module 178 that transmits, receives, and processes data to and from the primary power line 154.

During operation, a first operator may input desired weld settings to pendant 48. These weld settings are transmitted via conduit 160 through the auxiliary power distribution unit 156, across power line 158, through communication power interface module 100, through communication power interface module 174, along primary power line 154, and to the communication power interface module 176 located in power supply 138. In this way, data may be communicated both over auxiliary power lines 158 and 160 as well as over primary power line 154. Similarly, a second operator may input desired weld settings to pendant 48'. These weld settings are transmitted via power line 166 through the auxiliary power distribution unit 156, across power line 158, through communication power interface module 100', through communication power interface module 174', along primary power line 154, and to the communication power interface module 178 located in power supply 140. That is, the embodiment illustrated in FIG. 11 facilitates the bidirectional exchange of data over both an auxiliary power line as well as a primary weld power line. The foregoing features may have the effect of enabling the extraction of data regarding weld parameters at a location proximate to the weld power supplies 138 and 140. That is, presently contemplated embodiments allow a remotely located user to monitor the welding process without additional wires, cables, circuitry, and the like located proximate to the welding operation.

Figure 12:
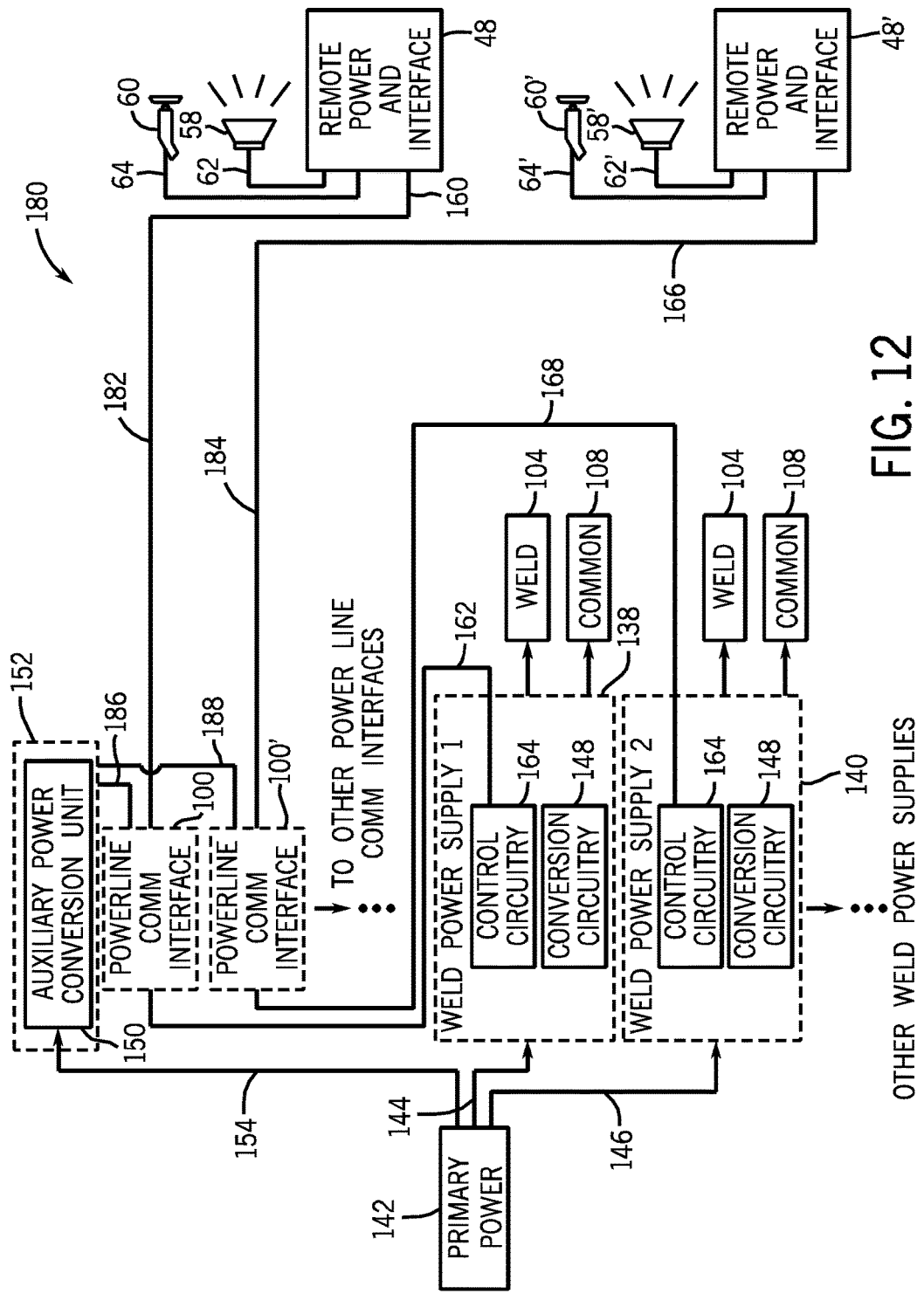
FIG. 12 is a diagram of an exemplary welding system that includes communication over an auxiliary power line via one or more free standing communication power interface modules in accordance with aspects of the present invention.

FIG. 12 illustrates a welding system 180 that includes a plurality of welding power supplies, e.g., the first weld power supply 138 and the second weld power supply 140. In other embodiments, any suitable number of weld power supplies may be included. A common power source, such as the AC power grid, an engine/generator set, or a battery, supplies primary power 142 to each of the power supplies 138 and 140 in the network via power lines 144 and 146, respectively. As before, the primary power 142 may be supplied from an offsite location and may be supplied onsite via a wall outlet, and the welding power supplies 138 and 140 include conversion circuitry 148, through which the incoming primary power is routed. Such conversion circuitry 148 may supply the weld power output 104. The weld power output 104 may be supplied to a welding device (e.g., a MIG torch, a TIG torch, a stick stinger) for use in a welding operation. A common ground output 108 may also extend from each power supply 138 and 140 to close the welding circuit.

The primary power 142 is also supplied to the auxiliary power conversion unit 150 located in the receiving and transmitting (RT) unit 152 via power line 154. In some embodiments, the RT unit 152 may be located in close proximity to a rack of weld power supplies, e.g., 138 and 140, and may include additional components not shown in FIG. 12. As before, the auxiliary power conversion unit 150 is adapted to receive primary power at a high voltage and output auxiliary power at a lower voltage. In this embodiment, however, the RT unit 152 is coupled to communication power interface modules 100 and 100', which are configured to transmit, receive, and process data transmitted to and from the power supplies 138 and 140 as well as to and from the remotely located pendants 48, 48'. That is, in the illustrated embodiment, the communication power interface modules 100 and 100' are free standing and, accordingly, are not located in the RT unit 152.

In this embodiment, the plurality of pendants, as represented by pendants 48 and 48' but not meant to limit the invention, may be directly plugged into the communication power interface modules 100 and 100'. For example, in the illustrated embodiment, the communication power interface modules 100 and 100' are coupled to the pendants 48 and 48' via auxiliary power lines 182 and 184, respectively. However, in this embodiment, the communication power interface modules 100 and 100' are also coupled to the output of the auxiliary power conversion unit 150 via power lines 186 and 188, respectively. As such, the communication power interface modules 100 and 100' are adapted to bidirectionally communicate data over auxiliary power lines 182 and 184 to the pendants 48 and 48'. The pendants 48, 48' are still designed to provide power to one or more auxiliary devices 58, 58', 60, 60' at the location of one or more welds. That is, the pendants 48, 48' provide a user with both remote control of the welding settings as well as a remote source of auxiliary power for one or more welds.

Figure 13:
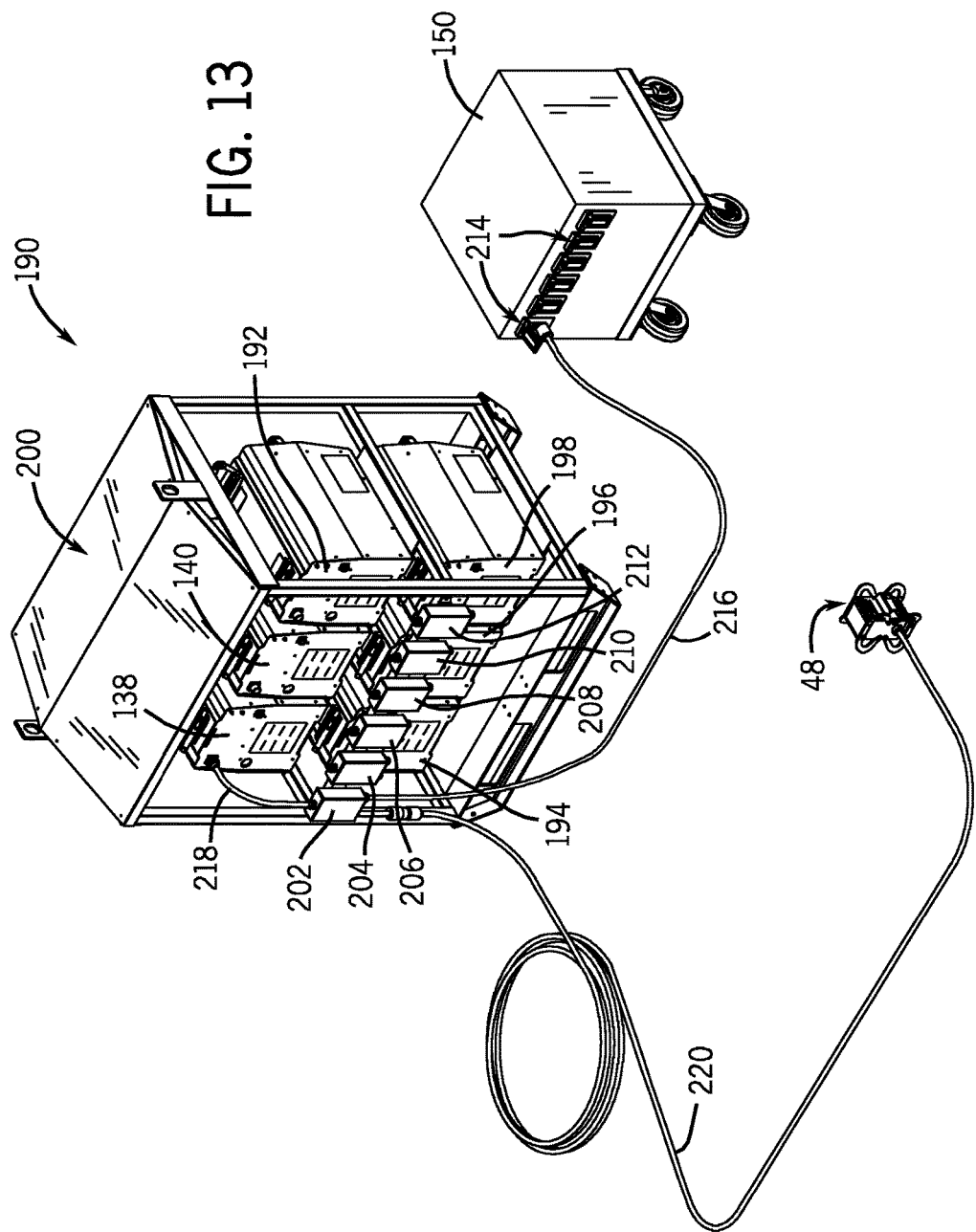
FIG. 13 is a perspective view of an exemplary weld system that includes one or more junction boxes associated with one or more weld power supplies in accordance with aspects of the present invention.

FIG. 13 is a perspective view illustrating an exemplary weld system 190 in accordance with aspects of the present invention. The weld system 190 includes a plurality of power supplies 138, 140, 192, 194, 196, and 198 disposed on a rack 200 adapted to support the power supplies. The weld system 190 further includes junction boxes 202, 204, 206, 208, 210, and 212 each associated with corresponding power supplies 138, 140, 192, 194, 196, and 198, respectively. For example, junction box 202 is associated with corresponding power supply 138, junction box 204 is associated with corresponding power supply 140, and so forth. In the illustrated embodiment, the junction boxes are coupled to the rack 200. However, in other embodiments, the junction boxes may be coupled to the power supplies, disposed on a separate rack, or positioned in any other suitable location. The weld system 190 further includes the auxiliary power conversion unit 150 and the pendant 48. In the illustrated embodiment, the auxiliary power conversion unit 150 includes auxiliary power receptacles 214 disposed thereon.

As shown, the auxiliary power conversion unit 150 is coupled to the first junction box 202 via cable 216. The junction box 202 is coupled to power supply 138 via cable 218 and to the pendant 48 via cable 220. Although not shown, the additional auxiliary outlets 214 may be coupled to the remaining junction boxes via additional cables, and the junction boxes may also be coupled to their corresponding power supplies and to the pendant via additional cables in further embodiments. During operation, the auxiliary power conversion unit 150 receives power from a primary power source and converts the primary power to an auxiliary power output (e.g., 115 volts). The auxiliary power is routed via auxiliary outlet 214 to the junction box 202 through cable 216. As such, the junction box 202 is adapted to receive the auxiliary power from the cable 216.

In the embodiments illustrated and described herein, the primary power is converted to auxiliary power in the auxiliary power conversion unit. However, it should be noted that in other embodiments, the auxiliary power may be generated in and received from a variety of other sources. For example, in one embodiment, the auxiliary power may be received from an outlet disposed in the wall. In such an embodiment, the cable 216 may couple the junction box directly to a wall outlet configured to deliver an auxiliary output power (e.g., 115 volts).

The junction box 202 is also adapted to transmit and receive control signals to and from the power supply 138 via control cable 218. The junction box 202 is further configured to couple the received control signals to the received auxiliary power and to transmit the auxiliary power and data to the pendant 48 via cable 220. It should also be noted that control signals may also be received by the junction box 202 from the pendant 48 via cable 220. As such, the junction box 202 may include any number of suitable components, such as a communication power interface module, electrical circuitry, and so forth.

Figure 15:
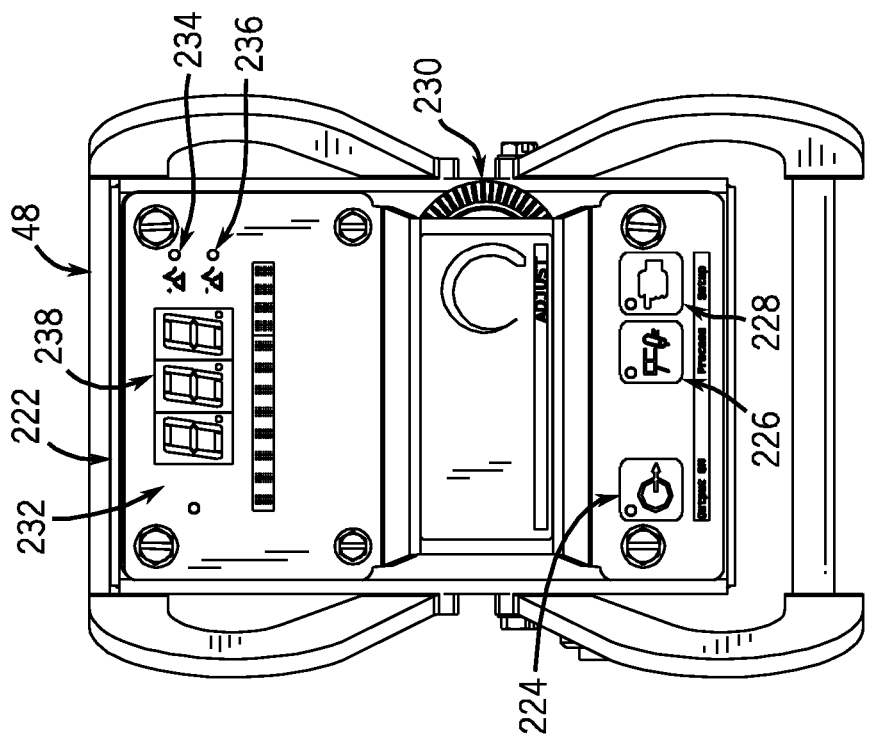
FIG. 15 is a perspective view of an exemplary operator interface that may be located on the pendant of FIG. 14 in accordance with aspects of the present invention.
Figure 14:
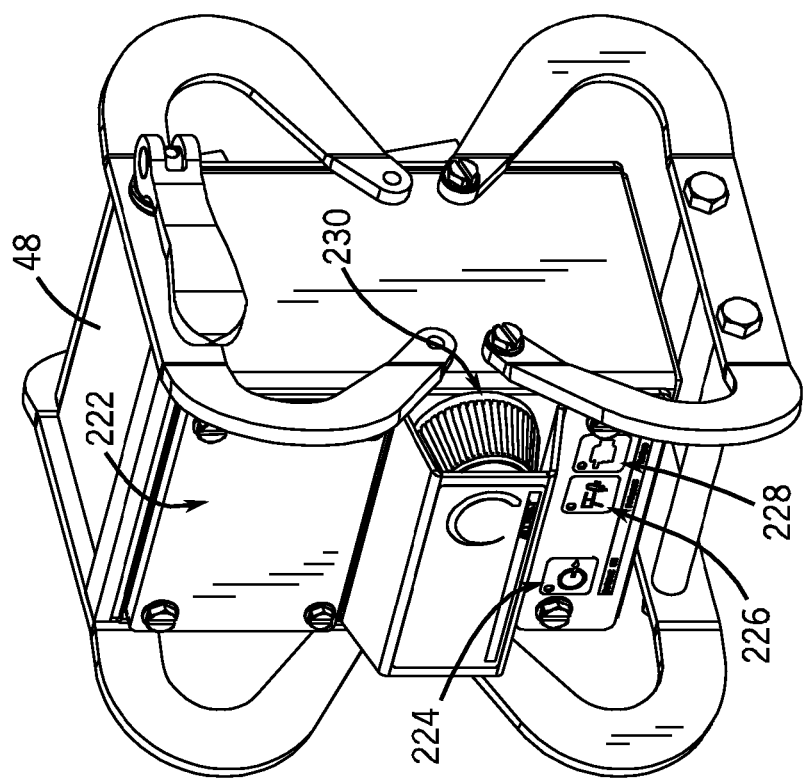
FIG. 14 is a perspective view of an exemplary pendant in accordance with aspects of the present invention.

FIGS. 14 and 15 illustrate an exemplary embodiment of the pendant 48 that may be employed in the weld system 190 of FIG. 13. As shown, the pendant 48 includes an operator interface 222, through which a user may control the welding process. For example, the illustrated operator interface 22 includes an ON/OFF button 224, which the user may press to enable or disable the welding output. The user interface 222 also includes a process selection button 226, which the user may press to change the welding process, e.g., between TIG welding and MIG welding. The user interface further includes a setup button 228, through which the operator may control a variety of parameters of the welding process, such as control of the arc, weld characteristics, and so forth. As such, a knob 230 may be used in conjunction with button 228 to change one or more weld characteristics and/or to change the magnitude of one or more weld parameters.

The user interface 222 also includes a display panel 232, through which one or more parameters or values of the welding process may be communicated to the user. For example, the display panel 232 includes a first indicator 234 and a second indicator 236. In one embodiment, the first indicator 234 may be a light emitting diode (LED) adapted to illuminate when a DCEP weld process is occurring, and the second indicator 236 may be an LED adapted to illuminate when a DCEN weld process is occurring. Still further, the display panel 232 may be configured to communicate one or more numerical values via display 238 to the user. For example, as the user turns the knob 230 to change a parameter of the welding process, the display 238 may display the value of the weld parameter (e.g., the voltage or amperage level).

Figure 16:
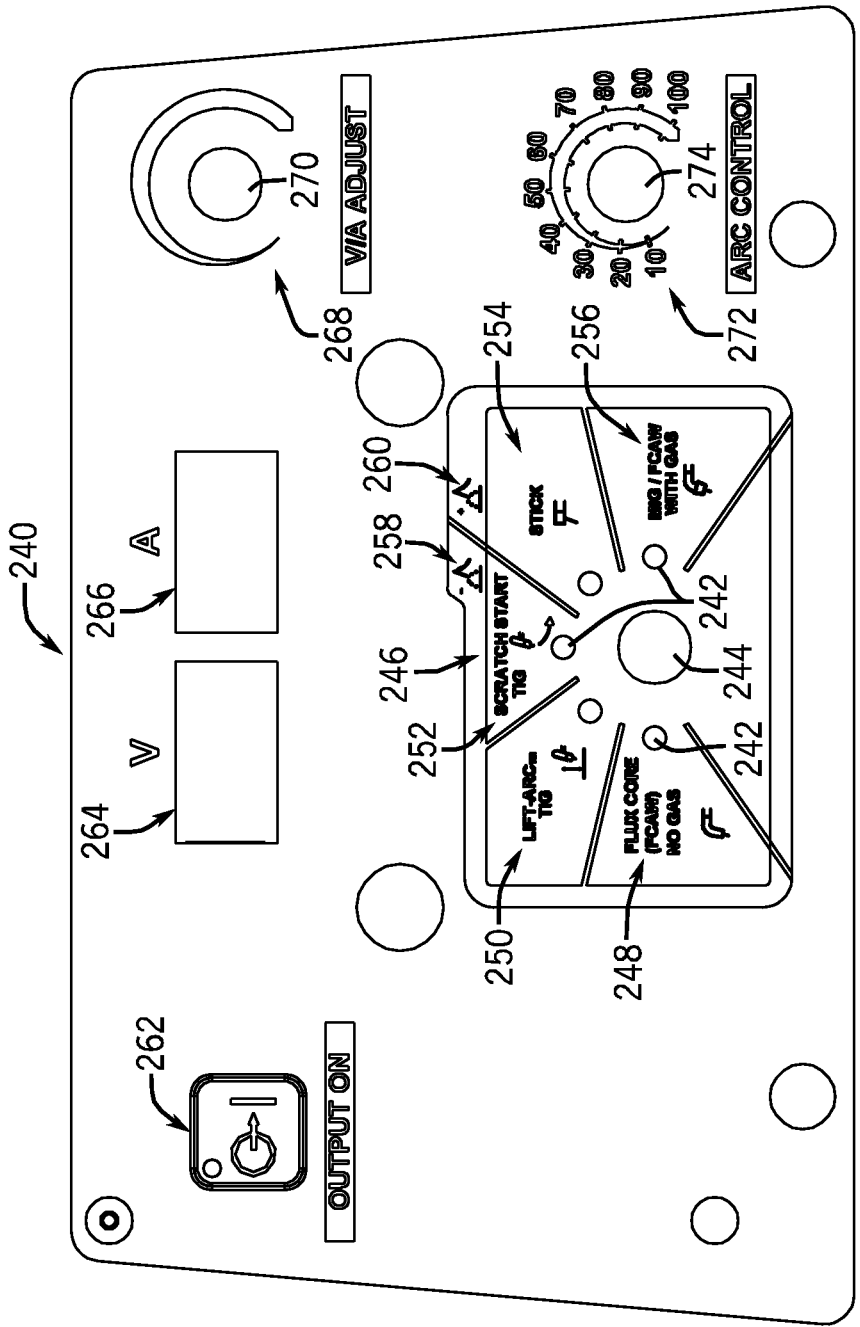
FIG. 16 illustrates an exemplary operator interface that may be located on one or more power supplies associated with the pendant of FIG. 14 in accordance with aspects of the present invention.

FIG. 16 illustrates an exemplary user interface 240 that may be disposed on the one or more power supplies in accordance with aspects of the present invention. The user interface 240 in the illustrated embodiment includes LEDs 242 positioned by process symbols that are configured to illuminate when a process is selected. In a presently contemplated embodiment, the user selects a welding process via a knob 244. As the user turns the knob 244, the LEDs are illuminated, indicating the chosen process. A selection panel 246 includes multiple sub-panels that allow the user to choose the welding process. For instance, in the illustrated embodiment, the selection panel 246 includes a flux core (FCAW) no gas panel 248, a lift-arc TIG panel 250, a scratch start TIG panel 252, a stick panel 254, and a MIG/FCAW with gas panel 256. When the user turns the knob 244, LED associated with the panel associated with the suitable process is illuminated and the process is initiated. For instance, if the user turns knob 244 to the stick panel 254, the stick LED is illuminated, and the power supply receives and processes the stick user selection. Additionally, as the user turns the knob 244, the polarity of the chosen process is communicated to the user via the DCEN icon 258 and the DCEP icon 260.

The user interface 240 also includes a power button 262, through which the user may enable or disable the welding output. The user interface 240 also includes a voltage display 264 and an amperage display 266, which display the voltage and amperage of the weld process, respectively. For example, the user may utilize the adjustment panel 268 by rotating knob 270 to set the desired voltage or amperage of the weld process, which is displayed on panels 264 and 266. Still further, the operator interface includes an arc control panel 272, through which the user may adjust an arc parameter via rotation of knob 274.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system comprising:
   a power supply unit that in operation outputs welding power at welding terminals and outputs a combined signal comprising an auxiliary power signal combined with a modulated data signal to an auxiliary power conductor; and
   a pendant located remotely with respect to the power supply unit, wherein the pendant receives the combined signal via the auxiliary power conductor and provides auxiliary power to one or more auxiliary devices plugged into the pendant based on the auxiliary power signal received via the auxiliary power conductor, wherein the pendant is configured to communicate data with the power supply unit via the modulated data signal of the combined signal from the auxiliary power conductor.

2. The welding system of claim 1, wherein the pendant includes one or more power receptacles configured to output the auxiliary power to the one or more auxiliary devices.

3. The welding system of claim 1, wherein the pendant comprises a wire feeder enabled when a metal inert gas (MIG) process or a MIG/flux core process is selected.

4. The welding system of claim 1, wherein the communication of data is bidirectional between the power supply unit and the pendant.

5. The welding system of claim 1, wherein the pendant is configured to allow a user to select a welding process and to communicate the selection to the power supply unit via the auxiliary power conductor.

6. The welding system of claim 1, comprising a first set of controls located on the power supply unit and a second set of controls located on the pendant, and wherein at least one of the first set of controls is disabled automatically when the pendant is coupled to the power supply unit via the auxiliary power conductor.

7. The welding system of claim 1, comprising one or more gas sources and one or more gas conduits connected to the one or more gas sources.

8. The welding system of claim 7, wherein the one or more gas conduits supply one or more gases to a welding torch.

9. A welding system comprising:
   a power supply that outputs welding power for a welding application and outputs a combined signal comprising an auxiliary power signal and a data signal, wherein the auxiliary power signal provides power to one or more auxiliary devices via an auxiliary power conductor; and
   a remote pendant coupled to the power supply via the auxiliary power conductor and configured to receive the auxiliary power signal from the power supply via the auxiliary power conductor, to provide the auxiliary power signal to the one or more auxiliary devices plugged into the remote pendant, and to exchange data with the power supply via the same auxiliary power conductor.

10. The welding system of claim 9, wherein the remote pendant is configured to permit user selection of at least one welding parameter and to communicate the user selection to the power supply via the auxiliary power conductor.

11. The welding system of claim 9, wherein the remote pendant comprises at least one auxiliary electrical receptacle into which a power cord for at least one of the auxiliary devices may be plugged, and the at least one auxiliary electrical receptacle is configured to output at least a portion of the auxiliary power signal to the at least one of the auxiliary devices.

12. The welding system of claim 9, comprising a first set of controls located on the power supply and a second set of controls located on the remote pendant, and wherein at least one of the first set of controls are disabled automatically when the remote pendant is communicatively coupled to the power supply via the auxiliary power conductor.

13. The welding system of claim 9, wherein the remote pendant comprises a wire feeder enabled when a metal inert gas (MIG) process or a MIG/flux core process is selected.

14. The welding system of claim 9, comprising one or more gas sources and one or more gas conduits connected to the one or more gas sources.

15. The welding system of claim 14, wherein the one or more gas conduits supply one or more gases to a welding torch via gas valving located in the power supply.

16. A welding system comprising:
   a power supply that outputs welding power for a welding application and a combined signal comprising an auxiliary power signal for powering one or more auxiliary devices and a modulated data signal; and
   an auxiliary power distribution unit located external to the power supply and configured to receive the auxiliary power signal from the power supply, to output the auxiliary power signal to a plurality of remote pendants via an auxiliary power conductor, and to exchange data via the modulated data signal through the auxiliary power conductor, wherein the power supply is configured to exchange the data with the auxiliary power distribution unit via the same auxiliary power conductor, a control cable, a primary power conduit, or a combination thereof.

17. The welding system of claim 16, wherein the plurality of remote pendants each include one or more power receptacles configured to output power to the one or more auxiliary devices.

18. The welding system of claim 17, wherein the one or more auxiliary devices comprise lights, grinders, or hand tools.

19. The welding system of claim 16, wherein the exchange of data via the auxiliary power conductor is bidirectional.

20. The welding system of claim 16, wherein the plurality of remote pendants are each configured to select a welding process and to communicate the selection to the power supply via the auxiliary power conductor.

\* \* \* \* \*